Oct. 6, 1925.
G. R. RODDY
CONVEYER
Filed April 25, 1923
1,556,562
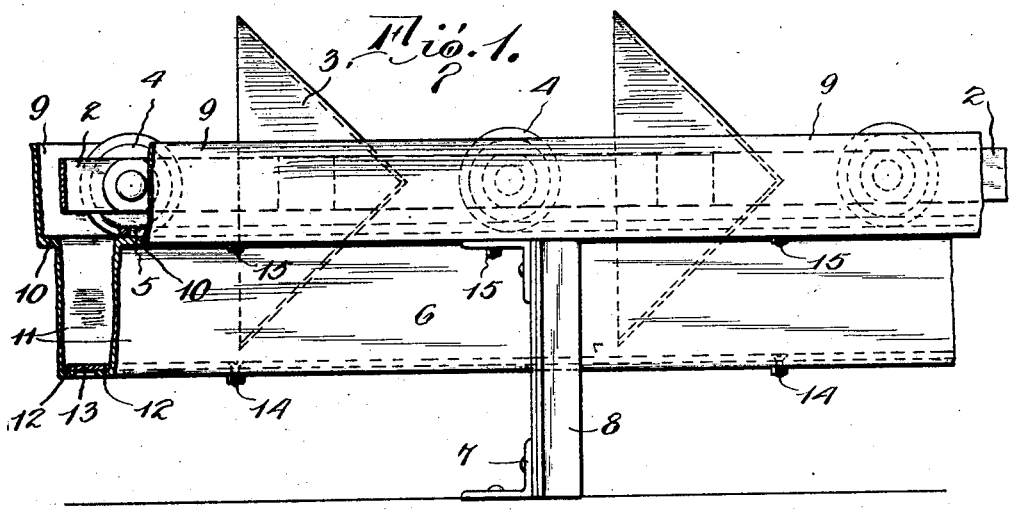
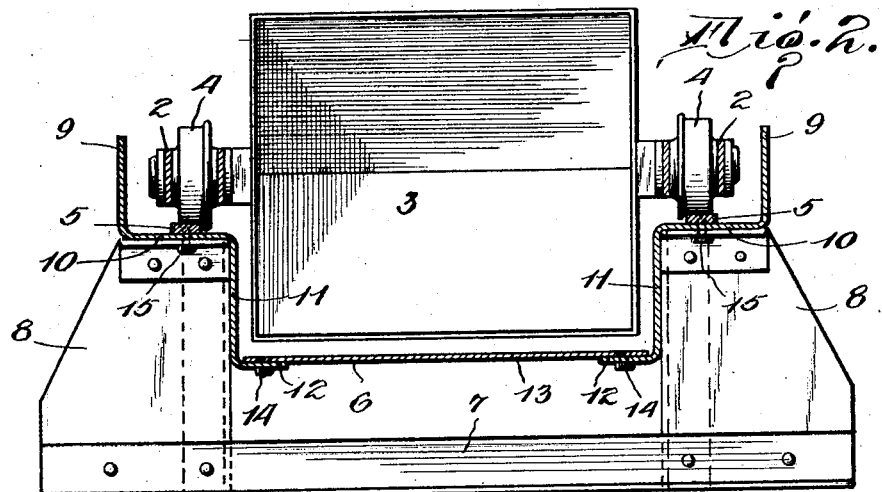
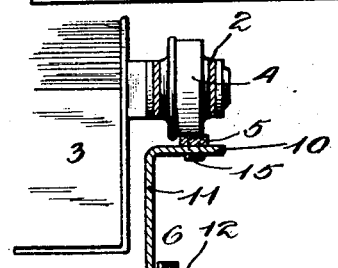
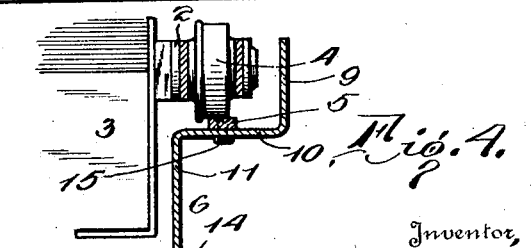
Inventor,
Gustav R. Roddy
By John S. Barker
Attorney Patented Oct. 6, 1925.

1,556,562

UNITED STATES PATENT OFFICE.

GUSTAV R. RODDY, OF MILWAUKEE, WISCONSIN, ASSIGNOR TO CHAIN BELT COMPANY, OF MILWAUKEE, WISCONSIN, A CORPORATION OF WISCONSIN.

CONVEYER.

Application filed April 25, 1923. Serial No. 634,556.

*To all whom it may concern:*

Be it known that I, GUSTAV R. RODDY, a citizen of the United States, residing at Milwaukee, in the county of Milwaukee and State of Wisconsin, have invented certain new and useful Improvements in Conveyers, of which the following is a specification.

My invention relates to scraping conveyers in which the material to be moved is delivered to a trough along which it is moved by scrapers, of one construction or another, the scrapers or moving elements being secured to sprocket chains or other power transmitting elements that are usually of a flexible nature so that the scrapers may be arranged in an endless series that they may run continuously in one direction. Material handled by this type of conveyer is frequently of hard, heavy and abrading nature, with the result that the troughs are rapidly worn and cut out by the material, necessitating their frequent repair and replacement. The wear is particularly severe along the bottom of the trough which bears the major portion of the weight of the material.

The present invention has for its object to improve the construction of conveyer troughs, particularly where scraper conveyers are used, in such wise as to give a three-piece trough so that parts which may become worn, and particularly the bottoms of the troughs, may be removed and replaced, without necessitating the replacement of an entire section of the trough when any part of it becomes sufficiently worn to make further use impracticable.

In the accompanying drawings—

Figure 1 is a side elevation of a short section of a scraping conveyer embodying my invention.

Fig. 2 is a transverse sectional view of the same.

Figs. 3 and 4 are detail sectional views illustrating different embodiments of my invention.

I will first describe the form of my invention illustrated in Figs. 1 and 2, which is the form I consider most desirable. The moving elements of the conveyer illustrated consist of a pair of conveyer or sprocket chains 2, 2, between and secured to which are the scraping elements 3. These may be of any suitable construction, those illustrated being V-shaped, a form well known and in common use in the art. The chains are provided with rollers 4 adapted to run upon tracks 5 supported in proximity to the trough 6 to which the material that is to be moved is delivered. The trough which is formed of a pair of opposite, one-piece angular side plates and a separable bottom, is supported by a series of cross frames 7 which are provided at their ends with pedestals or supports 8, 8. Upon the opposite series of pedestals are supported angular side plates which are preferably Z-shaped in cross section. The intermediate portions 10 of the side plates, which constitute the top flanges thereof, rest upon the seats of the pedestals 8, 8, to which they are bolted or otherwise secured, and upon their upper faces are secured the tracks or rails 5. These intermediate portions thus constitute horizontal flanges or shelves at the sides of the trough, at a level higher than the trough bottom and above which move the conveyer chains 2. To the outer edges of the intermediate portions of the side plates are secured up-turned flanges 9 bounding the said intermediate portions 10, and serving as guards for the chains and to prevent material from spilling from or being forced out of the trough.

11 indicates flanges of the side plates extending downward from the inner edges thereof along the inner edges of the pedestals of the cross frames, to which they may be directly secured if desired. These flanges constitute the side walls of the trough, and to them are secured the bottom plates 13.

The flanges 11 have at their lower edges lateral flanges 12, preferably inturned so that the edges of the bottom plates may rest thereon and be secured thereto by bolts and nuts 14. The rails 5 are secured in place by bolts 15, which bolts may also serve to secure the side plates to the pedestals of the cross frames.

The bottom plates of the trough may be easily removed and replaced when they become worn, and this may be done without in any way interfering with the side plates which form the sides of the trough. If these be worn, a section, on either one side or the other of the trough, may be removed and replaced without necessitating the replacement of other parts. The structural elements from which the trough is made are of simple form and do not require the construction of elaborate and costly special machinery for their manufacture, and they may be easily assembled to form the complete trough.

In Fig. 3 I have illustrated a form of my invention that would be practicable for some purposes, in which the upturned guard flanges 9 are omitted and where the lateral flanges 12 are turned outwardly and have the bottom plates bolted to their under sides.

In Fig. 4 I show still another embodiment of my invention in which the upturned flanges 9 are present. The downwardly extending flanges 11 constituting the side walls of the conveyer trough are not in this form provided with lateral flanges 12 to which the bottom plates are secured. However, in this construction the joints where the side and bottom plates are united are flanged for purposes of strength and facility in uniting them, the flange in this instance being carried by the bottom plates.

What I claim is:—

1. A conveyer trough, comprising one-piece angular side plates and intermediate separable and replaceable bottom plates, the side plates being formed with downward extending flanges to which the bottom plates are directly and separately secured, and with top flanges adapted to serve as supports for the conveyers.

2. A conveyer trough such as described in claim 1, having the joints where the bottom plates and side plates are united flanged and the means that separably secure the bottom plates pass through the flanged joints.

3. A conveyer trough such as described in claim 1, in which the unitary side plates are substantially Z-shaped, the upper elements of which extend upward from the outer edges of the top flanges.

4. A conveyer trough such as described in claim 1, in which the side plates are of substantially Z-shape, the upper elements of which extend upward from the outer edges of the top flanges, and the downward extending flanges to which the bottom plates are secured are inturned and have the bottom plates resting upon them.

5. A conveyer trough, comprising opposite, one-piece, angular side plates substantially Z-shape in cross section, and intermediate bottom plates, the central portions of the side plates being arranged substantially horizontally and constituting track supports for the conveyer, the upper portions constituting guards for the conveyer and the lower portions constituting the side walls of the conveyer trough and having the bottom plates secured to them, the joints where the side and bottom plates are united being flanged.

6. A conveyer trough such as described in claim 1, in combination with tracks secured to the top flanges of the side plates.

7. A conveyer trough such as described in claim 1, in which the unitary side plates are substantially Z-shaped, the upper elements of which extend upward from the outer edges of the top flanges, in combination with tracks secured to the said top flanges of the side plates.

GUSTAV R. RODDY.